(12) United States Patent
Ishi

(10) Patent No.: US 11,068,216 B2
(45) Date of Patent: Jul. 20, 2021

(54) PRINT DATA GENERATING APPARATUS, CAPABLE OF DETERMINING OPTIMIZED RASTER IMAGE PROCESSOR (RIP) SETTING CONDITIONS THAT MAXIMIZE PRINTING SPEED

(71) Applicant: Riso Kagaku Corporation, Tokyo (JP)

(72) Inventor: Keiichiro Ishi, Ibaraki (JP)

(73) Assignee: RISO KAGAKU CORPORATION, Tokyo (JP)

(*) Notice: Subject to any disclaimer, the term of this patent is extended or adjusted under 35 U.S.C. 154(b) by 0 days.

(21) Appl. No.: 16/876,713

(22) Filed: May 18, 2020

(65) Prior Publication Data
US 2020/0379690 A1 Dec. 3, 2020

(30) Foreign Application Priority Data
May 29, 2019 (JP) .............................. JP2019-100073

(51) Int. Cl.
*G06F 3/12* (2006.01)
*G06N 20/00* (2019.01)
*G06K 15/02* (2006.01)

(52) U.S. Cl.
CPC .......... *G06F 3/1215* (2013.01); *G06F 3/1205* (2013.01); *G06F 3/1244* (2013.01); *G06F 3/1254* (2013.01); *G06K 15/1836* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 9,529,554 B2 | 12/2016 | Akiyama | |
| 9,723,175 B2 | 8/2017 | Ishitoya | |
| 9,851,929 B2 | 12/2017 | Masuda | |
| 9,946,503 B2 | 4/2018 | Katabami | |

(Continued)

FOREIGN PATENT DOCUMENTS

| | | |
|---|---|---|
| EP | 3483719 A1 | 5/2019 |
| JP | 2013-043294 A | 3/2013 |

OTHER PUBLICATIONS

Search Report issued in European Patent Office (EPO) Patent Application No. 20176787.8, dated Oct. 28, 2020.

*Primary Examiner* — Henok Shiferaw
(74) *Attorney, Agent, or Firm* — Greenblum & Bernstein, P.L.C.

(57) ABSTRACT

A print data generating apparatus includes a machine learning unit that has a learned model which is obtained by inputting and conducting machine teaming of the relationships among data size of document data of a plurality of print jobs, print setting conditions, RIP setting conditions and printing speeds when the document data are printed by a printing unit; a printing speed predicting unit that predicts the printing speed of a print job to be printed by inputting the data size of the document data of the print job to be printed, the print setting conditions, and arbitrary RIP setting conditions into the learned model; and an optimized RIP setting condition determining unit that determines optimized RIP setting conditions that result in the printing speed which is predicted by the printing speed predicting unit approaching or becoming greater than or equal to a processing seed of the printing unit.

5 Claims, 8 Drawing Sheets

(56) References Cited

U.S. PATENT DOCUMENTS

| | | |
|---|---|---|
| 10,528,854 B2 | 1/2020 | Masuda |
| 2007/0070379 A1* | 3/2007 | Rai ........................ G06Q 10/06 358/1.13 |
| 2014/0355043 A1* | 12/2014 | Zeng ..................... G06F 3/1259 358/1.15 |
| 2018/0107905 A1 | 4/2018 | Davies et al. |
| 2019/0138256 A1* | 5/2019 | Kahwaji ............... G06F 3/1273 |

* cited by examiner

FIG.6

| | | | |
|---|---|---|---|
| DATA SIZE 1 | PRINT SETTING CONDITION 1 | RIP SETTING CONDITION 1 | PREDICTED PRINTING SPEED 1 |
| | | RIP SETTING CONDITION 2 | PREDICTED PRINTING SPEED 2 |
| | | RIP SETTING CONDITION 3 | PREDICTED PRINTING SPEED 3 |
| | | RIP SETTING CONDITION 4 | PREDICTED PRINTING SPEED 4 |
| | PRINT SETTING CONDITION 2 | RIP SETTING CONDITION 1 | PREDICTED PRINTING SPEED 5 |
| | | RIP SETTING CONDITION 2 | PREDICTED PRINTING SPEED 6 |
| | | RIP SETTING CONDITION 3 | PREDICTED PRINTING SPEED 7 |
| | | RIP SETTING CONDITION 4 | PREDICTED PRINTING SPEED 8 |
| | PRINT SETTING CONDITION 3 | RIP SETTING CONDITION 1 | PREDICTED PRINTING SPEED 9 |
| | | RIP SETTING CONDITION 2 | PREDICTED PRINTING SPEED 10 |
| | | RIP SETTING CONDITION 3 | PREDICTED PRINTING SPEED 11 |
| | | RIP SETTING CONDITION 4 | PREDICTED PRINTING SPEED 12 |
| | PRINT SETTING CONDITION 4 | RIP SETTING CONDITION 1 | PREDICTED PRINTING SPEED 13 |
| | | RIP SETTING CONDITION 2 | PREDICTED PRINTING SPEED 14 |
| | | RIP SETTING CONDITION 3 | PREDICTED PRINTING SPEED 15 |
| | | RIP SETTING CONDITION 4 | PREDICTED PRINTING SPEED 16 |
| DATA SIZE 2 | PRINT SETTING CONDITION 1 | RIP SETTING CONDITION 1 | PREDICTED PRINTING SPEED 17 |
| | | RIP SETTING CONDITION 2 | PREDICTED PRINTING SPEED 18 |
| | | RIP SETTING CONDITION 3 | PREDICTED PRINTING SPEED 19 |
| | | RIP SETTING CONDITION 4 | PREDICTED PRINTING SPEED 20 |
| | PRINT SETTING CONDITION 2 | RIP SETTING CONDITION 1 | PREDICTED PRINTING SPEED 21 |
| | | RIP SETTING CONDITION 2 | PREDICTED PRINTING SPEED 22 |
| | | RIP SETTING CONDITION 3 | PREDICTED PRINTING SPEED 23 |
| | | RIP SETTING CONDITION 4 | PREDICTED PRINTING SPEED 24 |
| | PRINT SETTING CONDITION 3 | RIP SETTING CONDITION 1 | PREDICTED PRINTING SPEED 25 |
| | | RIP SETTING CONDITION 2 | PREDICTED PRINTING SPEED 26 |
| | | RIP SETTING CONDITION 3 | PREDICTED PRINTING SPEED 27 |
| | | RIP SETTING CONDITION 4 | PREDICTED PRINTING SPEED 28 |
| | PRINT SETTING CONDITION 4 | RIP SETTING CONDITION 1 | PREDICTED PRINTING SPEED 29 |
| | | RIP SETTING CONDITION 2 | PREDICTED PRINTING SPEED 30 |
| | | RIP SETTING CONDITION 3 | PREDICTED PRINTING SPEED 31 |
| | | RIP SETTING CONDITION 4 | PREDICTED PRINTING SPEED 32 |
| DATA SIZE 3 | PRINT SETTING CONDITION 1 | RIP SETTING CONDITION 1 | PREDICTED PRINTING SPEED 33 |
| | ⋮ | ⋮ | ⋮ |
| | PRINT SETTING CONDITION 4 | | PREDICTED PRINTING SPEED 48 |
| DATA SIZE 4 | PRINT SETTING CONDITION 1 | RIP SETTING CONDITION 1 | PREDICTED PRINTING SPEED 49 |
| | ⋮ | ⋮ | ⋮ |
| | PRINT SETTING CONDITION 4 | | PREDICTED PRINTING SPEED 64 |

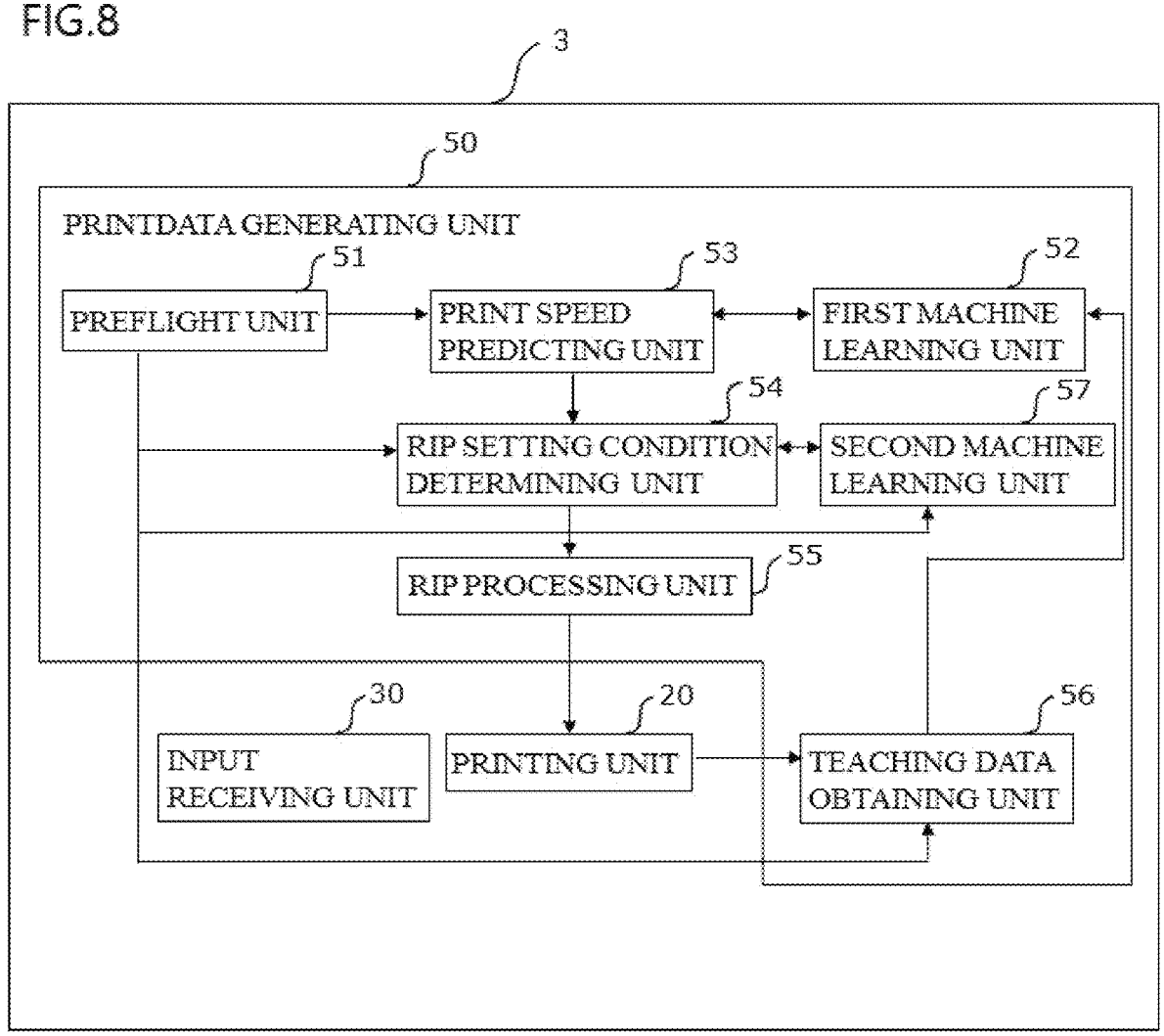

PRINT DATA GENERATING APPARATUS, CAPABLE OF DETERMINING OPTIMIZED RASTER IMAGE PROCESSOR (RIP) SETTING CONDITIONS THAT MAXIMIZE PRINTING SPEED

CROSS-REFERENCE TO RELATED APPLICATIONS

The present application claims priority under 35 U.S.C. § 119 to Japanese Patent Application No. 2019-100073, filed on May 29, 2019. The above application is hereby expressly incorporated by reference, in its entirety, into the present application.

BACKGROUND OF THE INVENTION

1. Field of the Invention

The present invention is related to a print data generating apparatus that generates print data by performing RIP (Raster Image Processor) processing on document data included in a print job.

2. Description of the Related Art

Printing apparatuses that receive a PDL (Page Description Language) format print job which is output from a computer and perform printing based on the print job are conventionally known.

In such printing apparatuses, a PDL format print job which is received is subjected to a RIP process, thereby generating print data (refer to Japanese Unexamined Patent Publication No. 2013-43294, for example).

The RIP process is a process for generating print data by rasterizing a print job after parsing the print job. Printing apparatuses perform printing based on the print data which is generated by the RIP process.

SUMMARY OF THE INVENTION

Here, the aforementioned RIP process is performed based on predetermined RIP setting conditions. The RIP setting conditions include, for example, MTR (Multi Thread Rendering) setting conditions, the number of divided bands of document data when performing the RIP process, and the number of memories which are used for the RIP process. The MTR setting condition is the number of CPU threads which are used for the RIP process. The number of divided bands of document data is the number of bands to be divided when a single sheet of document data is divided into a plurality of bands (regions) and the RIP process is performed for each band.

It is preferable for such a RIP setting conditions to be conditions that maximizes printing speed. However, RIP setting conditions that maximize the printing speed differ according to the data size of the document data which is included in the print job and print setting conditions. The printing speed is the number of printed sheets per minute (ppm) which is calculated based on the time from when a printing apparatus receives a print job until a printed document is output. The printing speed is determined by the data size of the document data, the print setting conditions, and the RIP setting conditions, and varies depending on these conditions. In addition, here, to maximize the printing speed means to cause the printing speed to be as close as possible to the processing speed of a printing unit that prints the print job. The processing speed of the printing unit is a maximum speed (ppm) which is determined by the mechanical configuration of the printing unit, and is a fixed value.

The data size and print setting conditions of the document data of the print job can be acquired before printing. However, there are countless combinations of data sizes and print setting conditions. Therefore, it is difficult to create conditional expressions with respect to such combinations and to determine optimal RIP setting conditions that maximize the printing speed.

The present invention has been developed in view of the foregoing circumstances. It is an object of the present invention is to provide a print data generating apparatus which is capable of determining optimized RIP setting conditions that maximize printing speed.

A print data generating apparatus according to the present invention is equipped with: a machine learning unit that has a learned model which is obtained by inputting and conducting machine learning of the relationships among data sizes of document data, print setting conditions, RIP (Raster Image Processor) setting conditions, and printing speeds of a plurality of print jobs when the document data are printed by a printing unit; a printing speed predicting unit that predicts the printing speed of a print job to be printed by inputting the data size of the document data of the print job to be printed, the print setting conditions, and arbitrary RIP setting conditions into the learned model; an optimized RIP setting condition determining unit that determines optimized RIP setting conditions that result in the printing speed which is predicted by the printing speed predicting unit approaching or becoming greater than or equal to a processing speed of the printing unit, and a RIP processing unit that performs a RIP (Raster Image Processor) process for the print job to be printed based on the optimized RIP setting conditions which are determined by the RIP setting condition determining unit to generate print data, and outputs the generated print data to the printing unit.

The print data generating apparatus of the present invention is equipped with the machine learning unit that has a learned model which is obtained by inputting and conducting machine learning of the relationships among data sizes of document data, print setting conditions, RIP (Raster Image Processor) setting conditions and printing speeds of a plurality of print jobs when document data are printed by a printing unit; the printing speed predicting unit that predicts the printing speed of a print job to be printed by inputting the data size of the document data of the print job to be printed, the print setting conditions, and arbitrary RIP setting conditions into the learned model; and the optimized RIP setting condition determining unit that determines optimized RIP setting conditions that result in the printing speed which is predicted by the printing speed predicting unit approaching or becoming greater than or equal to a processing speed of a printing unit. Therefore, optimal RIP setting conditions that result in a maximum actual printing speed can be determined.

BRIEF DESCRIPTION OF THE DRAWINGS

FIG. 6 is a diagram that illustrates an example of a table in which predicted printing speeds corresponding to various RIP setting conditions are set in advance.

FIG. 8 is a block diagram that illustrates the schematic configuration of a printing apparatus that employs a print data generating apparatus according to a third embodiment of the present invention.

DETAILED DESCRIPTION OF THE EMBODIMENTS

Figure 1:
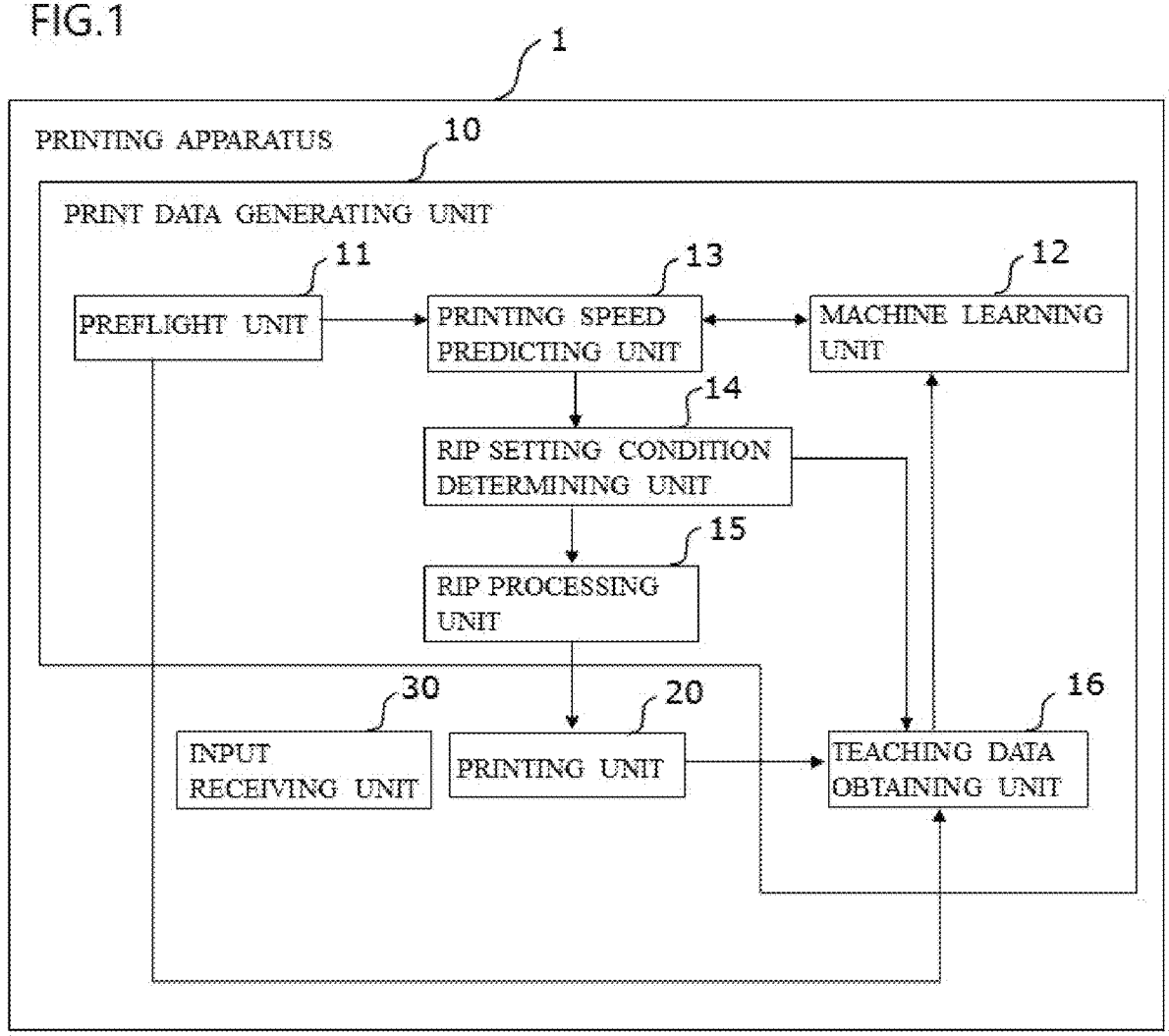
FIG. 1 is a block diagram that illustrates the schematic configuration of a printing apparatus that employs a print data generating apparatus according to a first embodiment of the present invention.

Hereinafter, a printing apparatus that employs a print data generating apparatus according to a first embodiment of the present invention will be described in detail with reference to the attached drawings. FIG. 1 is a block diagram that illustrates the schematic configuration of the printing apparatus 1 of the first embodiment.

As illustrated in FIG. 1, the printing apparatus 1 of the present embodiment is equipped with a print data generating unit 10, a printing unit 20, and an input receiving unit 30. In the present embodiment, the print data generating unit 10 corresponds to the print data generating apparatus of the present invention.

The print data generating unit 10 of the present embodiment is equipped with a preflight unit 11, a machine learning unit 12, a printing speed predicting unit 13, a RIP setting condition determining unit 14, a RIP processing unit 15, and a teaching data obtaining unit 16.

Figure 2:
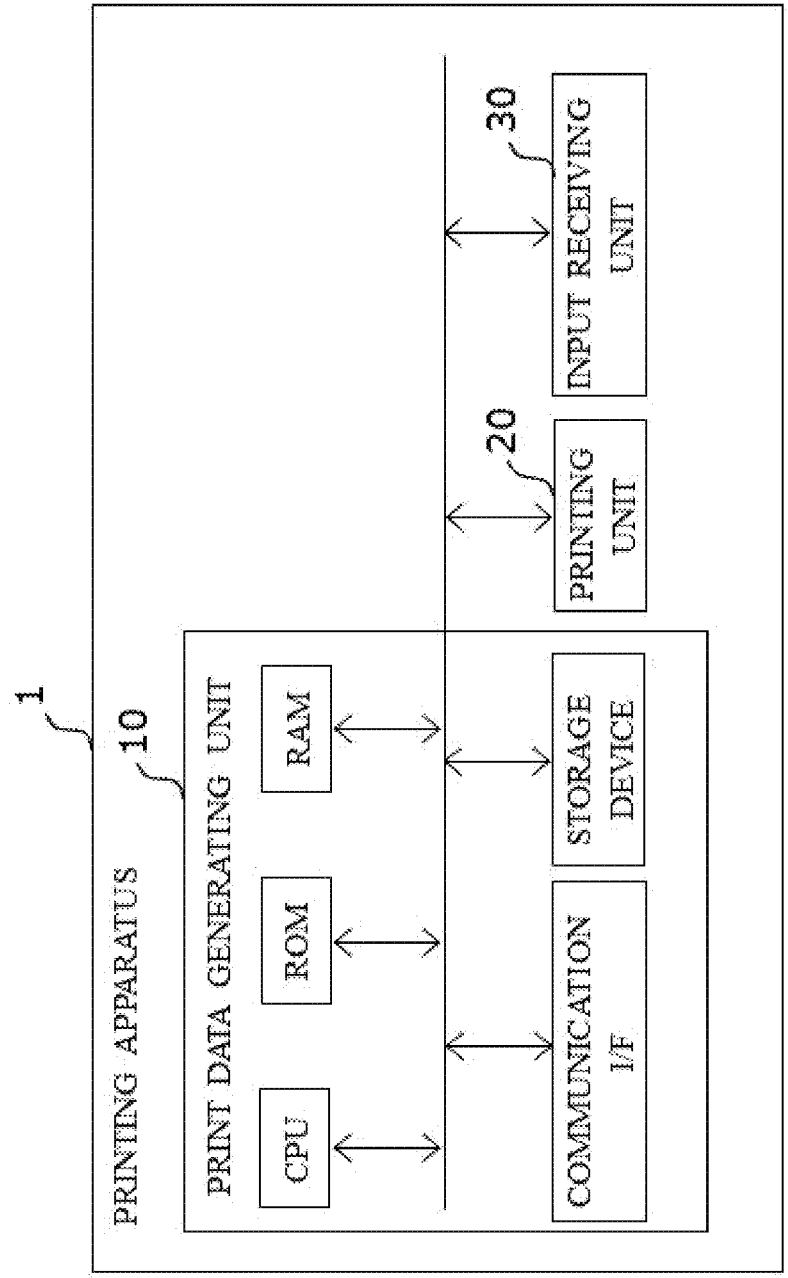
FIG. 2 is a diagram that illustrates an example of a hardware configuration of the printing apparatus that employs the print data generating apparatus according to the first embodiment of the present invention.

In addition, FIG. 2 is a diagram that illustrates an example of a hardware configuration of the printing apparatus 1 according to the present embodiment. As illustrated in FIG. 2, the print data generating unit 10 of the printing apparatus 1 of the present embodiment is equipped with a CPU (Central Processing Unit), semiconductor memories such as a ROM (Read Only Memory) and a RAM (Random Access Memory), a storage device such as a hard disk, and a communications interface. Note that although only one ROM and one RAM are illustrated in FIG. 2, the print data generating unit 10 of the present embodiment is equipped with a plurality of ROMs and a plurality of RAMs.

A print data generating program is installed in the semiconductor memory or the hard disk of the print data generating unit 10, and each unit of the print data generating unit 10 functions by the print data generation program being executed by the CPU.

In addition, a control program for controlling the operations of the printing unit 20 and the input receiving unit 30 is installed in the semiconductor memory or the hard disk of the print data generating unit 10. The operations of the printing unit 20 and the input receiving unit 30 are controlled by the control program being executed by the CPU. That is, the CPU in the print data generating unit 10 controls the operation of the print data generation unit 10 and controls the operations of the printing unit 20 and the input receiving unit 30 as well.

Note that in the present embodiment, the function of each unit of the print data generating unit 10 is realized by the print data generating program, and the control of the printing unit 20 and the input reception unit 30 is realized by the control program. However, the present invention is not limited to such a configuration, and some or the entirety of the functions and control may be realized by hardware such as an ASIC (Application Specific Integrated Circuit), a FPGA (Field Programmable Gate Array or other electric circuits.

Returning to FIG. 1, the preflight unit 11 receives a print job that includes document data which is output from a computer, for example, via the communication interface, and analyzes the print job. The preflight unit 11 of the present embodiment performs a preflight check of the print job, obtains the data size and print setting conditions of the document data which are included in the print job, and outputs the data size and the print setting conditions to the printing speed predicting unit 13 and the teaching data obtaining unit 16. The preflight unit 11 accepts not only print jobs which are output from the computer as described above but also print jobs that include document data which are read out by a scanner or the like, for example.

The data size of the document data is a total value of the data sizes of a plurality of pages of document data in the case that the print job includes document data for a plurality of pages.

The print setting conditions include, for example, color printing or monochrome printing conditions, single-sided printing or double-sided printing conditions, and N-up printing conditions. However, the print setting conditions are not limited to these, and other conditions may be included as long as they are setting conditions which are related to printing.

The machine learning unit 12 has a learned model, which is obtained in advance by inputting relationships among the data size, the print setting conditions, and the RIP setting conditions for document data of a plurality of print jobs and the printing speed when the document data is printed by the printing unit 20, and performing machine learning.

The learned model may be generated based on print jobs which are input to the printing apparatus 1, or generated based on the print results of print jobs by another printing apparatus having a printing unit equivalent to that of the printing apparatus 1, and then stored in the machine learning unit 12.

The RIP setting conditions are conditions which are employed when the RIP processing unit 15 performs the RIP process. For example, the RIP setting conditions include MTR setting conditions, the number of divided bands of document data when performing the RIP process, and the number of memories which are used for the RIP processing. However, other conditions may be included as long as the conditions are those which are employed in the RIP process.

The MTR setting conditions are the number of threads of the CPU which are employed in the RIP process.

Here, as the number of threads which are employed in the RIP process increases, the RIP process itself can be performed at a higher speed. However, it cannot be said that productivity increases as the number of threads used in the RIP process increases. Productivity is synonymous with printing speed, and is the number of printed sheets per minute (ppm) calculated based on the time from when the printing apparatus 1 receives a print job until the printed document is output.

This is because the CPU is also employed for processes other than the RIP process. In the case that a large number of threads are allocated to the RIP process, the number of CPU threads which are employed for the other processes is reduced. As a result, there are cases in which the overall processing efficiency is reduced, and the processing time will become long.

Figure 3:
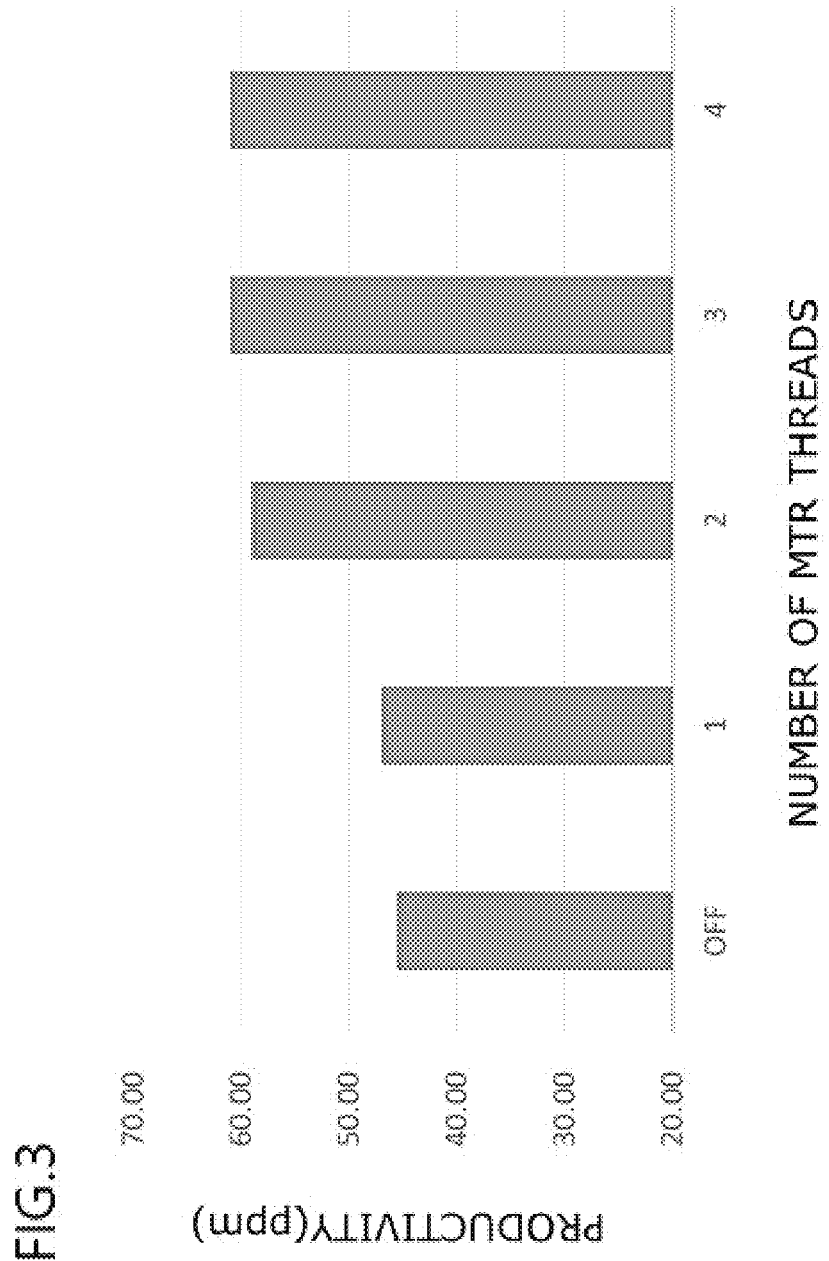
FIG. 3 is a graph that illustrates the relationship between numbers of threads of a RIP process and productivity (ppm) in the case of a color mode (automatic color printing)
Figure 4:
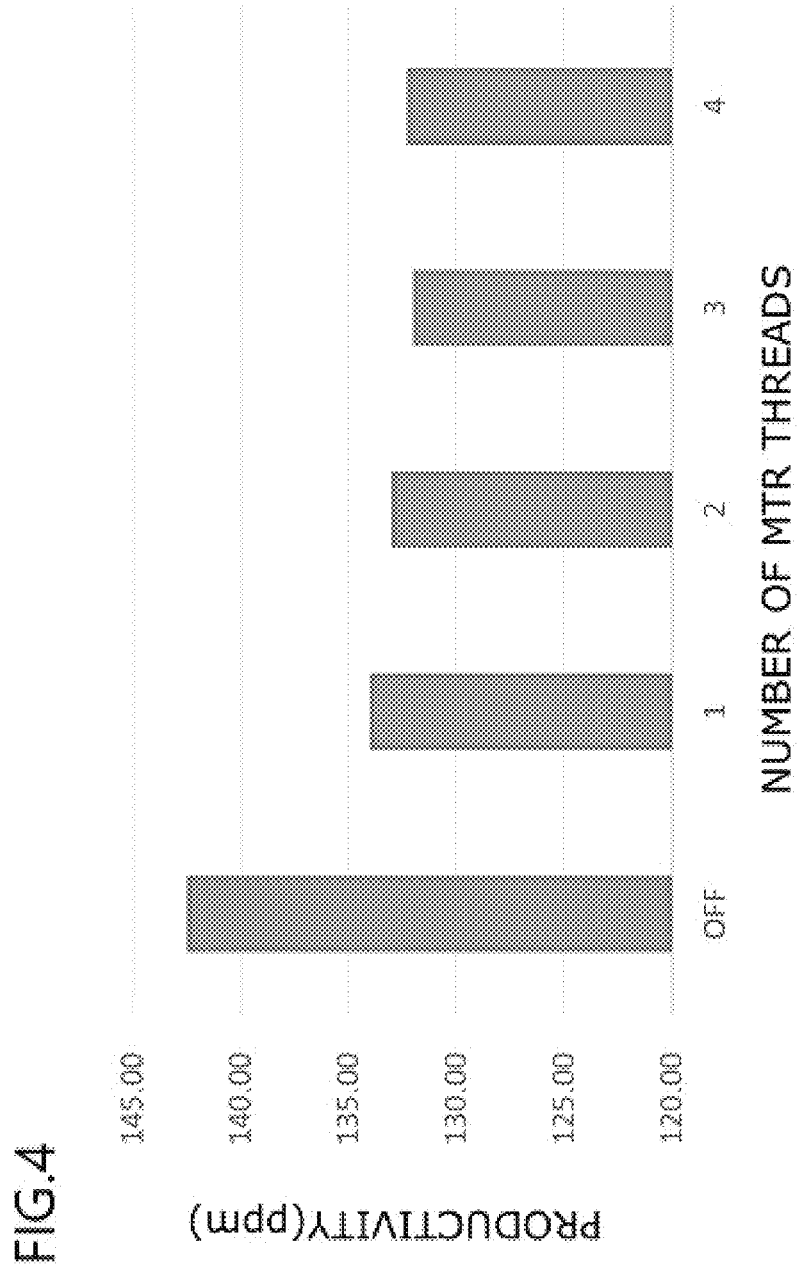
FIG. 4 is a graph that illustrates the relationship between numbers of threads of a RIP process and productivity (ppm) in the case of a color mode (gray scale).

The optimum number of threads for RIP processing that increases productivity is related to the print setting conditions as described above. FIG. 3 is a graph that illustrates the relationship between the number of threads for RIP processing and productivity (ppm) in a color mode (automatic color printing), and FIG. 4 is a graph that illustrates the relationship between the number of threads for RIP processing and productivity (ppm) in a color mode (grayscale). As illustrated in FIG. 3, in the color mode (automatic color printing), the productivity increases up to three threads, but the productivity only changes slightly between three threads and four threads. That is, in this case, it is better to set the number threads of the CPU for the RIP process to three, and to allocate the other threads of the CPU to processes other than the RIP process.

In addition, as illustrated in FIG. 4, in the case of color mode (gray scale), the productivity decreases as the number of threads which are allocated to the RIP process increases.

The combinations of the number of threads which are employed for the RIP process and the print setting condition are related to productivity, that is, the printing speed of the printing unit 20, in this manner.

In addition, the number of divided bands of document data in the RIP setting conditions is the number of bands (regions) that one sheet of document data is divided into in the case that the RIP process is performed for each band. In the case that the number of divided bands is small, the data size of document data that undergoes the RIP process at a time becomes large. In such a case, it becomes necessary to increase the number of memories (the number of semiconductor memories) which are employed for the RIP process to be described later. As a result, the number of memories which are allocated to processes other than the RIP process is reduced, and processing speed will become slow.

On the other hand, in the case that the number of divided bands is large, the data size of document data to be subjected to the RIP process at a time becomes small. In such a case, the number of memories which are employed for the RIP process can be decreased. However, it will be necessary to repeatedly perform the RIP process for each band. Therefore, the RIP processing speed will become slow.

The number of divided bands of document data and the number of memories which are employed for RIP processing in the RIP setting conditions are also related to productivity, that is, the printing speed of the printing unit 20, in this manner.

The learned model of the machine learning unit 12 is that which has learned the relationship among the data sizes of document data of the print job, print setting conditions, and the RIP setting conditions described above and the actual printing speed at that time, which are considered to be related to the printing speed in the priming unit 20 as inputs and has performed machine learning.

The printing speed predicting unit 13 inputs the data size of document data of a print job to be printed, print setting conditions, and arbitrary RIP setting conditions into the learned model which is stored in the machine learning unit 12, to predict the printing speed of the print job to be printed.

Specifically, the printing speed predicting unit 13 of the present embodiment acquires the data size and print setting conditions of the document data of the print job to be printed, which are output from the preflight unit 11. Next, the printing speed predicting unit 13 first inputs the data size and print setting conditions of the acquired document data and initially set RIP setting conditions which are set in advance to the learned model which is stored in the machine learning unit 12.

Then, the printing speed predicting unit 13 predicts the printing speed of the print job to be printed by acquiring a printing speed which is output from the learned model stored in the machine learning unit 12.

The RIP setting condition determining unit 14 determines an optimized RIP setting condition such that the printing speed which is predicted by the printing speed predicting unit 13 approaches the processing speed of the printing unit 20.

Specifically, the RIP setting condition determining unit 14 of the present embodiment first compares the printing speed which is predicted by the printing speed predicting unit 13 based on initially set RIP setting conditions with the processing speed of the printing unit 20 which is set in advance. The processing speed of the printing unit 20 is a processing speed (ppm) which is determined according to the mechanical configuration of the printing unit 20. The processing speed of the printing unit 20 is set and input by a user to the input receiving unit 30, for example, and stored in the RIP selling condition determining unit 14.

Next, in the case that the predicted printing speed is slower than the processing speed of the printing unit 20, that is, when the processing capability of the printing unit 20 cannot be sufficiently exhibited, the RIP setting condition determining unit 14 changes the aforementioned initial setting RIP setting conditions, and outputs the changed RIP setting conditions to the printing speed predicting unit 13. The printing speed predicting unit 13 inputs the changed RIP setting conditions, the data size of the document data of the print job to be printed, and the printing setting conditions into the learned model, and predicts the printing speed again.

The printing speed which is predicted by the printing speed predicting unit 13 is input to the RIP setting condition determining unit 14 again. The RIP setting condition determining unit 14 determines whether the predicted printing speed is within a threshold range which is set in advance based on the processing speed of the printing unit 20 as a reference. In the case that the predicted printing speed is not within the threshold range, the RIP setting condition determining unit 14 judges that the predicted printing speed is not approaching the processing speed of the printing unit 20, the RIP setting conditions are changed again, and the changed RIP setting conditions are output to the printing speed predicting unit 13.

As described above, the RIP setting condition determining unit 14 judges whether the printing speed predicted by the printing speed predicting unit 13 is within the threshold range which is set in advance. The RIP setting conditions are sequentially changed and output to the printing speed predicting unit 13 in the case that the predicted printing speed is not within the threshold range. Then, the printing speed predicting unit 13 sequentially predicts the printing speed using the learned model according to the input of the changed RIP setting conditions, and sequentially outputs predicted printing speeds to the RIP setting condition determining unit 14.

Then, by repeatedly changing the RIP setting conditions and predicting the printing speed, the RIP setting condition determining unit 14 determines optimized RIP setting conditions that result in the printing speed predicted by the printing speed predicting unit 13 being within the preset threshold range, and the optimized RIP setting conditions are output to the RIP processing unit 15.

The RIP processing unit 15 generates print data by performing RIP processing of the print job to be printed based on the optimized RIP setting conditions which are determined by the RIP setting condition determining unit 14, and outputs the print data to the printing unit 20.

When printing of the print job to be printed is completed by the printing unit 20 based on the print data which is generated by the RIP processing unit 15, the teaching data obtaining unit 16 obtains the printing speed, the data size of the document data of the print job, the print setting conditions, and the aforementioned optimized RIP setting conditions as teaching data, and the teaching data is output to the machine learning unit 12. The machine learning unit 12 further continues machine learning of the learned model employing the input teaching data, By performing machine learning of the learned model in the manner described above, it is possible to improve the prediction accuracy for printing speeds.

The printing unit 20 employs the print data which is output from the RIP processing unit 15 to perform printing on a print medium such as paper or film. The printing unit 20 of the present embodiment may include, for example, a print engine which has an inkjet head that performs printing by ejecting ink to a print medium. However, the printing unit 20 of the present invention is not limited to that which has such an inkjet print engine. The printing unit 20 may alternatively have a laser type print engine that transfers toner to a print medium using a photosensitive drum to perform printing, or a stencil printing type print engine.

The input receiving unit 30 is constituted by a touch panel that displays various types of information and receives various setting inputs by a user, for example. The input receiving unit 30 displays a printing condition setting input screen, and receives input of printing setting conditions from the user on the printing condition setting input screen, for example. The print setting conditions which are set and input via the print condition setting input screen are linked to document data which is read by, for example, a scanner, and included in the print job.

Figure 5:
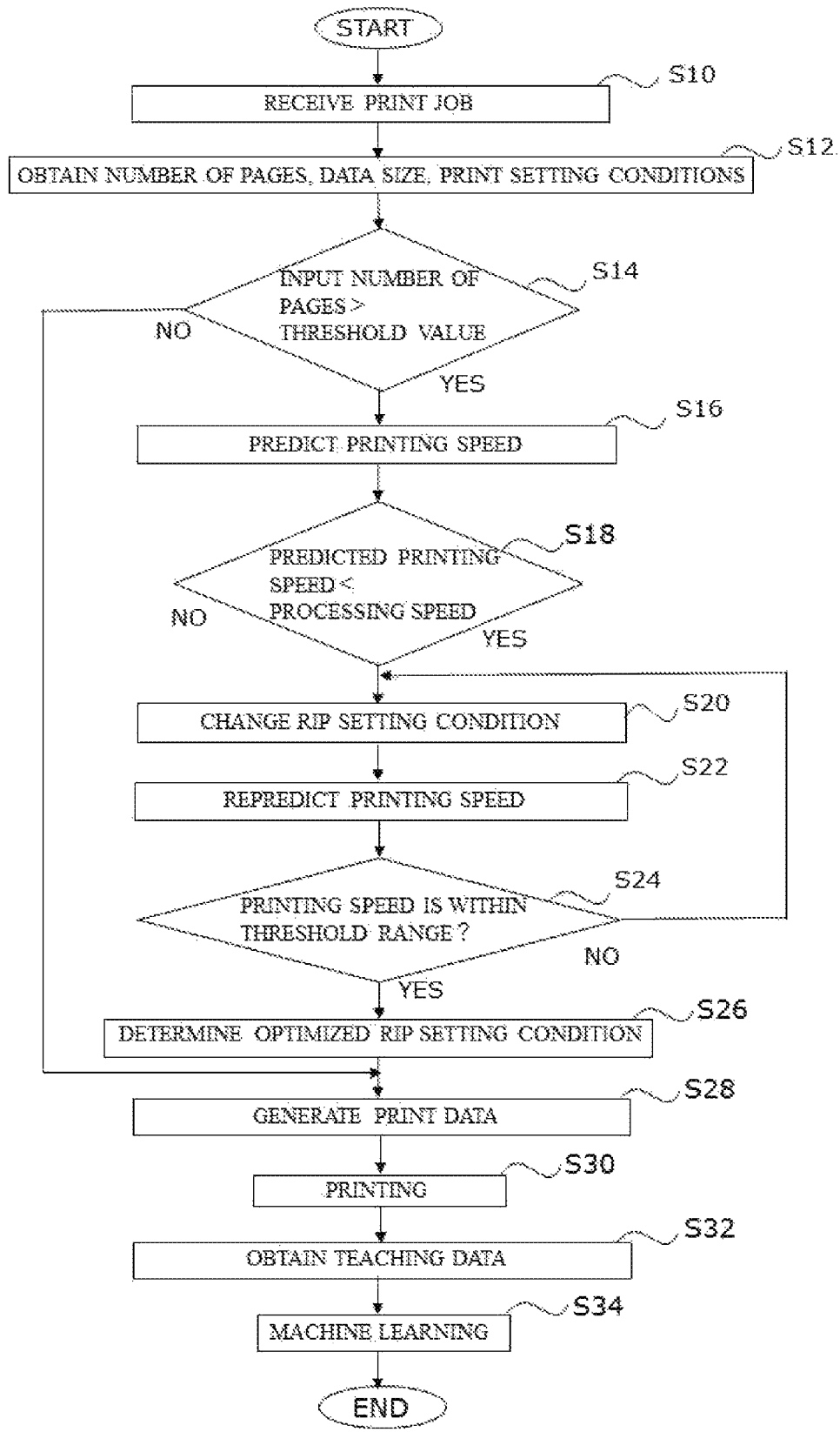
FIG. 5 is a flow chart for explaining processes which are performed by the printing apparatus according to the first embodiment.

Next, the steps of the process which is performed by the printing apparatus 1 according to the present embodiment will be described with reference to the flowchart illustrated in FIG. 5.

First, a print job which is output from a computer or the like is received by the preflight unit 11 (S10). The preflight unit 11 performs a preflight check of the print job as described above, and obtains the number of pages of the document data, the data size of the document data, and print setting conditions which are included in the print job (S12).

Then, the number of pages of the document data, the data size of the document data, and the print setting conditions which are output from the preflight unit 11 are input to the printing speed predicting unit 13. The printing speed predicting unit 13 compares the number of input pages with a threshold value which is set in advance (S14). If the number of input pages exceeds the threshold value (S14: YES), the printing speed predicting unit 13 predicts the printing speed of the print job employing the data size, the print setting conditions, and initially set RIP setting conditions (S16). Specifically, the printing speed predicting unit 13 inputs the data size of the document data, the print setting conditions, and the initially set RIP setting conditions to the learned model which is stored in the machine learning unit 12 as described above. Note that the threshold value may be set to one page, for example. However, the present invention is not limited to such a configuration, and a different number of pages may be set as the threshold value.

The printing speed which is predicted by the printing speed predicting unit 13 is input to the RIP setting condition determining unit 14, and the RIP setting condition determining unit 14 compares the input printing speed and the processing speed of the printing unit 20 which is set in advance (S18).

Next, if the predicted printing speed is lower than the processing speed of the printing unit 20 (S18: YES), the RIP setting condition determination unit 14 changes the aforementioned initially set RIP setting conditions (S20). The changed RIP setting conditions are output to the printing speed predicting unit 13.

The printing speed predicting unit 13 inputs the changed RIP setting conditions, the data size of the document data of the print job to be printed, and the print setting conditions to the learned model, and predicts the printing speed again (S22).

The printing speed which is predicted again by the printing speed predicting unit 13 is input to the RIP setting condition determining unit 14 again. The RIP setting condition determining unit 14 determines whether the printing speed which is predicted again is within a threshold range which is set in advance (S24). If the printing speed which is predicted again is not within the threshold range which is set in advance (S24: NO), the RIP setting condition determining unit 14 changes the RIP setting conditions again (S20), and outputs the changed RIP setting conditions to the printing speed predicting unit 13. Then, in response to the input of the changed RIP setting condition, the printing speed predicting unit 13 predicts the printing speed again using the learned model and outputs the printing speed which is predicted again to the RIP setting condition determining unit 14 (S22).

The prediction of the printing speed by the printing speed predicting unit 13 and the change of the RIP setting conditions by the RIP setting condition determining unit 14 are repeated until the printing speed which is predicted by the printing speed predicting unit 13 falls within the threshold range which is set in advance. Then, the RIP setting condition determining unit 14 determines the RIP setting conditions at the time when the predicted printing speed falls within the threshold range which is set in advance as optimized RIP setting conditions, and outputs the optimized RIP setting conditions to the RIP processing unit 15 (S24: YES, S26).

Next, the RIP processing unit 15 generates print data by performing RIP processing of the print job to be printed based on the optimized RIP setting conditions which are determined by the RIP setting condition determining unit 14, and outputs the print data to the printing unit 20 (S28).

On the other hand, if it is judged in step S14 that the number of input pages is less than or equal to the threshold value (S14: NO), the printing speed prediction processing by the printing speed predicting unit 13 and the optimized RIP setting condition by the RIP setting condition determination unit 14 are not performed. In the case that the number of pages of the print job is small, the RIP processing itself does not take much time, and there may be cases in which the processing time will become longer if the aforementioned printing speed predicting process and optimized RIP setting condition determining process are performed. Therefore, in the case that the number of pages of the print job is small, the processing time can be shortened by omitting the printing speed predicting process and the optimized RIP setting condition determining process. In addition, the load on the CPU can be reduced, and processing efficiency can be improved.

In this case, the RIP processing unit 15 generates print data by performing a RIP process based on the initially set RIP setting conditions (S28), and outputs the print data to the printing unit 20.

In addition, if it is judged in step S18 that the printing speed which is predicted based on the initially set RIP setting conditions is greater than or equal to than the processing speed of the printing unit 20 (S18: NO), the RIP setting condition determining unit 14 does not perform optimized RIP setting condition determining process. As described above, processing time can be shortened by omitting the optimized RIP setting condition determining process when the process is unnecessary. In addition, the load on the CPU can be reduced, and processing efficiency can be improved.

In this case as well, the RIP processing unit 15 generates print data by performing a RIP process based on the initially set RIP setting conditions (S28), and outputs the print data to the printing unit 20.

Then, the printing unit 20 performs printing on the print medium based on the input print data (S30).

When the printing of the print job is completed by the printing unit 20, the printing speed at the time of printing, the data size of the document data of the print job, the print setting conditions, and the optimized RIP setting conditions are obtained by the teaching data obtaining unit 16 (S32). The teaching data obtaining unit 16 outputs the teaching data to the machine learning unit 12. The machine learning unit 12 further continues machine learning of the learned model using the input teaching data (S34).

According to the printing apparatus 1 of the first embodiment described above, the data size of the document data, the print setting conditions, and the arbitrary RIP setting conditions of the print job to be printed are input to the learned model of the machine learning unit 12. Thereby, the printing speed of the print job to be printed is predicted. Further, optimized RIP setting conditions are determined such that the predicted printing speed approaches the processing speed of the printing unit. Therefore, optimized RIP setting conditions that maximize the actual printing speed can be determined. In addition, the burden on the user is reduced, because the printing speed is improved.

Note that in the printing apparatus 1 of the first embodiment, the RIP setting condition determining unit 14 determines the RIP setting conditions at the time when the predicted printing speed falls within a preset threshold range as the optimized RIP setting conditions. However, the present invention is not limited to such a configuration, and the RIP setting conditions at the time when the predicted printing speed becomes greater than or equal to the processing speed of the printing unit 20 may be determined as the optimized RIP setting conditions.

In addition, in the printing apparatus 1 of the first embodiment, the RIP setting condition determining unit 14 repeatedly performs the prediction of the printing speed by changing the RIP setting conditions, and thereby determines the optimized. RIP setting conditions. However, if the printing speed is predicted every time the RIP setting condition is changed, there is a possibility that the processing time will become long.

Therefore, the learned model described above may be employed to calculate printing speeds corresponding to various RIP setting conditions in advance, and the printing speeds may be stored in the RIP setting condition determining unit 14 as a table. In this case, the RIP setting condition determining unit 14 may determine optimized RIP setting conditions by referring to the table based on the data size, the print setting conditions, and the processing speed of the printing unit 20 which are obtained by the preflight unit 11.

FIG. 6 is a diagram that schematically illustrates an example of such a table. The predicted printing speeds in the table illustrated in FIG. 6 are values which are obtained by employing the learned model described above. Specifically, in the case that the data size of the document data is data size 1 and the print setting conditions are print setting conditions 1 and the RIP setting conditions are changed to RIP setting conditions 1 through 4, the printing speeds which are predicted by the learned model are predicted printing speeds 1 through 4, for example. Note that data sizes 1 through 4 are set as ranges of data sizes such as 1 to 50 kilobytes, 51 to 100 kilobytes, 101 to 150 kilobytes, etc.

For example, in the case that the data size of the print job to be printed is within the range of data size 1 and the print setting conditions are print setting conditions 1, the RIP setting condition determining unit 14 specifies a predicted printing speed which is closest to the processing speed of the printing unit 20 from among predicted printing speeds 1 to 4 based on the processing speed of the printing unit 20, by referring to the table illustrated in FIG. 6. In the case that the predicted printing speed which is closest to the processing speed of the printing unit 20 is predicted printing speed 1, the RIP setting condition determining unit 14 determines RIP setting conditions 1 that correspond to predicted printing speed 1 as the optimized RIP setting conditions.

By determining the optimized RIP setting conditions by employing a table which is set in advance as described above, it becomes possible to shorten the processing time of the process for determining the optimized RIP setting conditions.

In the printing apparatus 1 according to the first embodiment, the data size of the document data of the print job, the print setting conditions, and the RIP setting conditions are used as the information which is input to the learned model. Other types of information may be added as the information which is input to the learned model, in order to increase the accuracy of prediction of the printing speeds which are output by the leaned model.

Specifically, in the case that the user is performing an operation such as inputting settings via the input receiving unit 30, for example, the operation of the input receiving unit 30 is controlled by the CPU in the print generating unit 10. As a result, the ratio of the CPU which is dedicated to the RIP process processing will be reduced, and there is a possibility that printing speed (productivity) will be affected.

In addition to the operation control of the input receiving unit 30, in the case that printing of a previous print job is being performed by the printing unit 20, for example, the operation of the printing unit 20 is controlled by the CPU in the print data generating unit 10. As a result, the ratio of the CPU which is dedicated to the RIP process processing will be reduced, and there is a possibility that printing speed (productivity) will be affected.

Further, in the case that a cleaning operation of the inkjet head is performed or consumables such as ink, toner, and printing paper are being replaced while the RIP process of the print job is being performed, operation of the printing unit 20 is ceased during such a cleaning operation or replacement of the consumables. Because printing operations by the printing unit 20 is ceased during this time, the ratio of the CPU which is dedicated to the RIP processing increases, and there is a possibility that printing speed (productivity) will be affected.

That is, information related to a current operational state of the printing apparatus 1 such as the operational state of the input reception unit 30 and the operational state of the printing unit 20 described above, or the operationally ceased state of the printing unit 20 during the cleaning operation and the replacement of consumables described above, which may occur during processing of a print job to be printed, may be employed as additional information which is input to the learned model. Thereby, it will become possible to improve the accuracy of prediction of printing speeds employing the learned model.

Note that the additional information described above which is input to the learned model is obtained by the CPU and employed as information which is input to the learned model when the learned model is generated and when a printing speed is predicted using the generated learned model.

In addition, with respect to the information related to the operational state of the printing apparatus 1 that may occur during the processing of the print job is performed, in the case of the cleaning operation, for example, the cleaning operation is performed at every preset number of printed pages. Therefore, the number of printed pages from the previous cleaning operation can be obtained. Thereby, it becomes possible to determine whether a cleaning operation will be performed during the processing of the print job to be printed (whether the operation of the printing unit 20 will be ceased). Further, with respect to the replacement timing of the consumables, whether the replacement timing of the consumables (the operational ceased state of the printing unit 20 occurring) will occur during the processing of the print job to be printed can be determined by obtaining the remaining amount of the consumables. Then, these determination results may be used as information which is input to the learned model.

Further, in the printing, apparatus 1 of the first embodiment, the data size of the document data of the print job is employed as the information Which is input to the learned model. However, the speed of the RIP process of the document data also changes depending on the resolution of the document data, the ratio of photographs and text, the coverage rate in the document, etc., which affects the printing speed (productivity). Accordingly, the information which is input to the learned model may further include features of the document data, such as the resolution of the document data, the ratio of photographs and text, and the coverage rate in the document. Thereby, it becomes possible to improve the prediction accuracy of printing speeds employing the learned model. Note that the features of the document data described above are also obtained and employed as information which is input when generating a learned model and estimating a printing speed using the generated learned model.

Next, a printing apparatus 2 that employs a second embodiment of the print data generating apparatus of the present invention will be described. In the printing apparatus 1 according to the first embodiment, the printing speed is predicted by employing the learned model based on the data size of the document data of the print job, the print setting conditions, and the RIP setting conditions, and the optimized RIP setting conditions, by which the predicting printing speed approaches the processing speed of the printing unit 20, are obtained by changing the RIP setting conditions However, if this method is executed for a plurality of print jobs, a plurality of combinations of data sizes of document data, print setting conditions, and optimized RIP setting conditions for the predetermined print jobs can be obtained.

The printing apparatus 2 according to the second embodiment has a learned model which is newly generated using the aforementioned plurality of combinations of data sizes of document data, print setting conditions, and optimized RIP setting conditions. Specifically, the learned model of the second embodiment is obtained by machine learning performed by employing relationships between each set of the data size of document data and the print setting conditions, and the optimized RIP setting conditions as inputs. Note that the learned model in the printing apparatus 1 of the first embodiment corresponds to a first learned model of the present invention, and the learned model which is newly added in the printing apparatus 2 of the second embodiment is corresponds to a second learned model of the present invention.

The printing apparatus 2 according to the second embodiment determines optimized RIP setting conditions for a print job to be printed, by inputting the data size of document data and print setting conditions to the newly generated teamed model (second learned model) described above.

Figure 7:
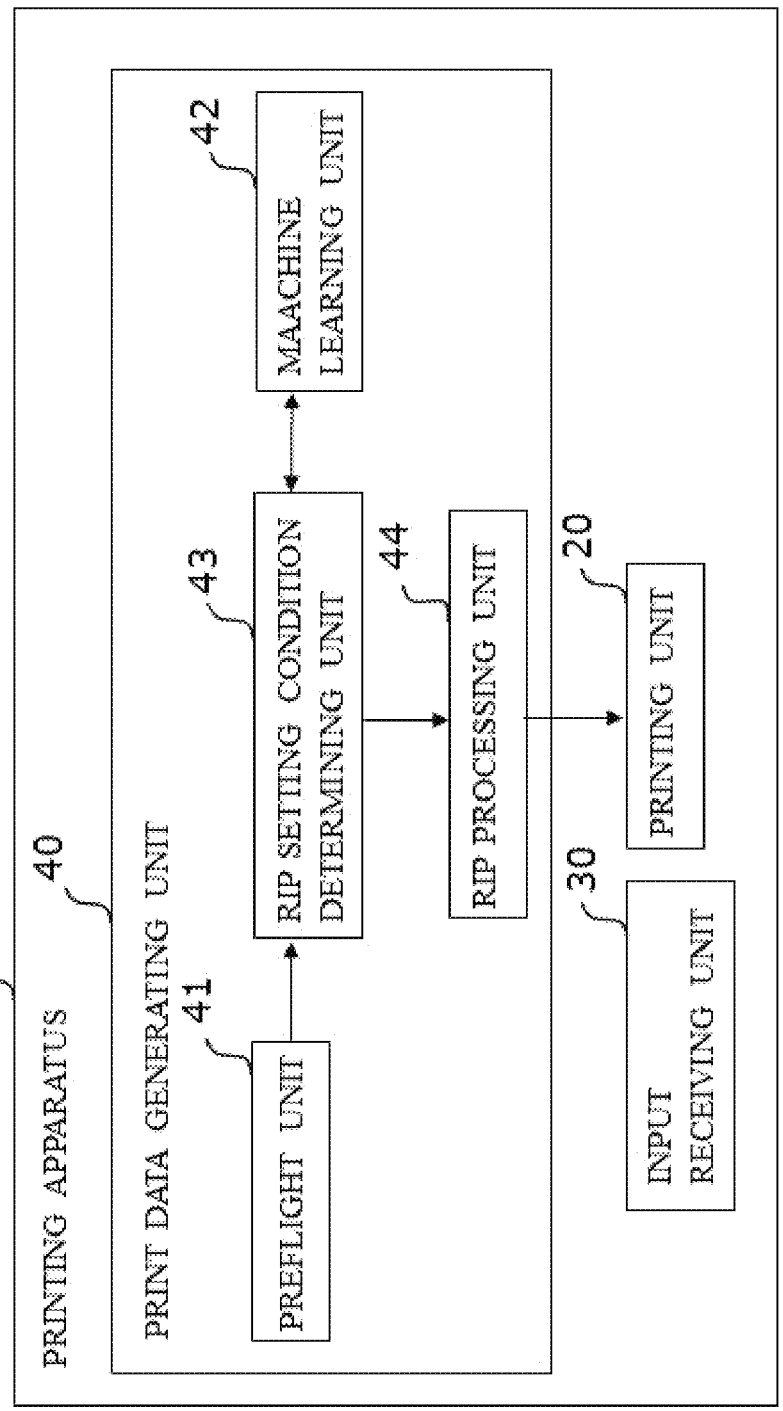
FIG. 7 is a block diagram that illustrates the schematic configuration of a printing apparatus that employs a print data generating apparatus according to a second embodiment of the present invention.

FIG. 7 is a block diagram that illustrates the schematic configuration of the printing apparatus 2 according to the second embodiment. As illustrated in FIG. 7, the printing apparatus 2 of the second embodiment is equipped with a print data generating unit 40, a printing unit 20, and an input receiving unit 30.

The print data generating unit 40 of the second embodiment is equipped with a preflight unit 41, a machine learning unit 42, a RIP setting condition determining unit 43, and a RIP processing unit 44.

In a manner similar to that performed by the preflight unit 11 of the first embodiment, the preflight unit 41 receives a print job that includes document data which is output from a computer or the like, performs a preflight check of the print job, obtains the data size of the document data and the print setting conditions which are included in the print job, and outputs the data size and the print setting conditions to the RIP setting condition determining unit 43. Note that the data size of the document data and the print setting conditions are the same as those of the first embodiment.

The RIP setting condition determining unit 43 obtains the data size of the document data and print setting conditions which are output from the preflight unit 41, and inputs the obtained data size of the document data and print setting conditions to the learned model (second learned model) which is stored in the machine learning unit 42 in advance. Then, the RIP setting condition determining unit 43 determines optimized RIP setting conditions by obtaining the optimized RIP setting conditions which are output from the learned model of the machine learning unit 42.

The RIP processing unit 44 is the same as the RIP processing unit 15 of the first embodiment.

In addition, the printing unit 20 and the input receiving unit 30 are also the same as those of the printing apparatus 1 of the first embodiment.

The printing apparatus 2 of the second embodiment is equipped with the machine learning unit 42 having the learned model, which is obtained by machine learning the relationships between the data size of the document data and the print setting conditions of a plurality of print jobs and the optimized RIP setting conditions of the plurality of print jobs as inputs. The data size of document data and print setting conditions of a print job to be printed are input to the learned model of the machine learning unit 42, and optimized RIP setting conditions are determined. That is, in the printing apparatus 2 of the second embodiment, after the learned model (second learned model) of the machine learning unit 42 is once completed, a process for predicting printing speeds that employs a learned model (first learned model) such as that of the printing apparatus 1 of the first embodiment and a process for determining optimized RIP setting conditions are not conducted, and it is possible to determine optimized RIP setting conditions only by inputting the data size of document data and print setting conditions. Accordingly, optimized RIP setting condition that maximizes the actual printing speed can be determined by a simpler calculation process than that which is performed in the printing apparatus 1 of the first embodiment.

Note that in the printing apparatus 2 according to the second embodiment as well, the RIP setting condition determination unit 43 may compare the number of pages of the document data which is output from the preflight unit 41 and a predetermined threshold value in the same manner as in the first embodiment. In the case that the number of input pages exceeds the threshold value, the process of determining the optimized RIP setting condition using the learned model described above may be performed, and in the case that the number of input pages is less than or equal to the threshold, the process of determining the optimized RIP setting condition may not be performed. In this case, the RIP processing unit 44 generates print data by performing RIP process based on initially set RIP setting conditions, and outputs the print data to the printing unit 20.

In addition, in the printing apparatus 2 of the second embodiment as well, information on the current operating state of the printing apparatus 2 described above, information on the operating state of the printing apparatus 2 which may be predicted during processing of a print job to be printed, the features of document data, etc. may be employed as additional information which is input to the learned model. Thereby, it will become possible to improve the accuracy of the optimized RIP setting conditions.

Note that in the case that such additional pieces of information are employed as information which is input to the learned model of the second embodiment, the additional pieces of information are also employed when obtaining the plurality of combinations of the data sizes of document data, print setting conditions, and optimized RIP setting conditions which are employed when generating the learned model of the second embodiment. That is, when acquiring the aforementioned combinations, the additional pieces of information described above are also employed as information which is input to the learned model of the second embodiment.

In addition, the printing apparatus 2 of the second embodiment may also be equipped with the learned model (first learned model) of the first embodiment. FIG. 8 is a block diagram that illustrates the schematic configuration of a printing apparatus 3 according to a third embodiment, which is equipped with both the learned model according to the first embodiment and the learned model according to the second embodiment.

The printing apparatus 3 according to the third embodiment is equipped with a print data generating unit 50, a printing unit 20, and an input reception unit 30. The printing unit 20 and the input receiving unit 30 of the printing apparatus 3 according to the third embodiment are the same as those in the first and second embodiments.

In addition, a preflight unit 51, a printing speed predicting unit 53, and a RIP processing unit 55 in the print data generating unit 50 are the same as those of the first and second embodiments.

Further, a first machine learning unit 52 and a teaching data obtaining unit 56 are the same as the machine learning unit 12 and the teaching data obtaining unit 16 of the first embodiment, and a second machine learning unit 57 is the same as the machine learning unit 42 of the second embodiment.

In the printing apparatus 3 of the third embodiment, a process of predicting printing speeds employing a learned model of the first machine learning unit 52 and a process of determining optimized RIP setting conditions is performed for a plurality of arbitrary print jobs in the same manner as in the first embodiment. Combinations of the data size of document data, the print setting conditions, and the optimized RIP setting conditions of the plurality of print jobs are input to the second machine learning unit 57 as teaching data. Machine learning is performed to generate a learned model similar to the learned model of the second embodiment.

Then, a RIP setting condition determining unit 54 of the printing apparatus 3 according to the third embodiment inputs the data size of document data and print setting conditions of a print job to be printed to the learned model of the second machine learning unit 57, and optimized RIP setting conditions of the print job to be printed are determined.

Next, a RIP process is performed employing the determined optimized RIP setting conditions, and a printing process is performed.

After the printing process is completed, the data size of the document data of the print job to be subjected to the printing process and the print setting conditions of the print job are input to the first learned model, a printing speed is predicted, and the aforementioned optimized RIP setting conditions are determined. Teaching data which is constituted by combinations of the data size of the document data, the printing conditions, and the optimized RIP setting conditions is generated. Then, by inputting the teaching data to the second machine learning unit 57, machine learning of the learned model of the second machine learning unit 57 can be continued further. Thereby, the accuracy of the optimized RIP setting condition can be improved.

Note that the other operational effects of the printing apparatus 3 of the third embodiment are the same as those of the first embodiment or the second embodiment.

In addition, the first through third embodiments described above are those in which the print data generating apparatus of the present invention is mounted in a printing apparatus. However, the present invention is not limited to such a configuration, and the print data generating apparatus of the first through third embodiments may be provided in an external controller that administers various image processes on document data of print jobs. The external controller is not equipped with a printing unit and is installed externally with respect to various printing apparatuses. In the case that the print data generating apparatus of the present invention is applied to an external controller, it is preferable for learned models to be provided for each of various printing methods such as the ink jet method, the laser method, and the stencil printing method. It is preferable for the learned model to be switched and utilized according to the printing method of printing units which are connected to the external controller.

The additional items below are also disclosed in relation with the print data generating apparatus of the present invention.

Additional Items

In the print data generating apparatus of the present invention, the RIP setting condition determining unit does not perform the process for determining optimized RIP setting conditions in the case that a printing speed which is predicted by the print speed predicting unit based on initially set RIP setting conditions is greater than or equal to the processing speed of the printing unit. The RIP processing unit can generate print data by performing a RIP process on the print job to be printed based on the initially set RIP setting conditions, and output the print data to the printing unit.

In addition, in the print data generating apparatus of the present invention, the RIP setting condition determining unit does not perform the process for predicting the printing speed prediction process or the process for determining optimized RIP setting conditions in the case that the number of pages of the document data of the print job to be printed is less than or equal to a threshold value which set in advance. The RIP processing unit can generate print data by performing a RIP process on the print job to be printed based on the initially set RIP setting conditions, and output the print data to the printing unit.

Further, the print data generating apparatus of the present invention may be equipped with a teaching data obtaining unit that obtains a printing speed at the time of printing, the data size of document data of a print job to be printed, the print setting conditions and the optimized RIP setting conditions as teaching data in the case that printing of the print job to be printed is completed by the printing unit, and outputs the teaching data for machine learning of the learned model.

A print data generating apparatus according to another aspect of the present invention is equipped with: a machine learning unit that has a first learned model which is obtained by inputting and conducting machine learning of the relationships among the data size of document data, print setting conditions, RIP (Raster Image Processor) setting conditions, and printing speeds of a plurality of print jobs when the document data are printed by a printing unit and a second learned model which is obtained by employing combinations of the data size and print setting conditions of document data of arbitrary print jobs and optimized RIP setting conditions, which are obtained by employing the first learned model to perform a predicting process for predicting the printing speed by inputting the data sizes of document data, print setting conditions, and arbitrary RIP setting conditions of the arbitrary print jobs and a determining process for determining optimized RIP setting conditions that would result in the predicted printing speed approaching or becoming greater than or equal to a processing seed of a printing unit, inputting the relationships between each of the combinations of the data sizes and the print setting conditions and optimized RIP setting conditions for each of the combinations, and conducting machine learning; a RIP setting condition determining unit that employs the second learned model to determine optimized RIP setting conditions of a print job to be printed, and a RIP processing unit that performs a RIP (Raster Image Processor) process for the print job to be printed based on the optimized RIP setting conditions which are determined by the RIP setting condition determining unit to generate print data, and outputs the generated print data to the printing unit.

What is claimed is:

1. A print data generating apparatus, comprising:
  a processor and a memory that stores an instruction, the apparatus further comprising, as a configuration when the processor executes the instruction stored in the memory:
  a machine learning unit that has a learned model which is obtained by inputting and conducting machine learning of the relationships among data size of document data, print setting conditions, RIP (Raster Image Processor) setting conditions of a plurality of print jobs and printing speeds when the document data are printed by a printing unit;
  a printing speed predicting unit that predicts the printing speed of a print job to be printed by inputting the data size of the document data of the print job to be printed, the print setting conditions, and arbitrary RIP setting conditions into the learned model;
  an optimized RIP setting condition determining unit that determines optimized RIP setting conditions that result in the printing speed which is predicted by the printing speed predicting unit approaching or becoming greater than or equal to a processing seed of the printing unit, and
  a RIP processing unit that performs a RIP (Raster Image Processor) process for the print job to be printed based on the optimized RIP setting conditions which are determined by the RIP setting condition determining unit to generate print data, and outputs the generated print data to the printing unit.

2. The print data generating apparatus as defined in claim 1, wherein:
  the RIP setting condition determination unit does not perform the optimized RIP setting condition determining process in the case that the printing speed which is predicted by the printing speed predicting unit based on initially set RIP setting conditions is greater than or equal to than the processing speed of the printing unit; and
  the RIP processing unit generates print data by performing a RIP process on the print job to be printed based on the initially set RIP setting conditions, and outputs the print data to the printing unit.

3. The print data generating apparatus as defined in claim 1, wherein:
  the RIP setting condition determination unit does not perform the printing speed predicting process and the optimized RIP setting condition determining process in the case that the number of pages of document data of the print job to be printed is less than or equal to a threshold value which is set in advance; and
  the RIP processing unit generates print data by performing a RIP process on the print job to be printed based on RIP setting conditions which are set in advance, and outputs the print data to the printing unit.

4. The print data generating apparatus a defined in claim 1, further comprising, as the configuration when the processor executes the instruction stored in the memory:
  a teaching data obtaining unit that obtains the printing speed, the data size of the document data to be printed, the print setting conditions, and the optimized RIP setting conditions of the print job as teaching data when printing of the print job to be printed is completed by the printing unit, and outputs the teacher teaching data for machine learning of the learned model.

5. A print data generating apparatus, comprising:
a processor and a memory that stores an instruction, the apparatus further comprising, as a configuration when the processor executes the instruction stored in the memory:
a machine learning unit that has:
   a first learned model which is obtained by inputting and conducting machine learning of the relationships among the data size of document data, print setting conditions, RIP (Raster Image Processor) setting conditions, and printing speeds of a plurality of print jobs when the document data are printed by a printing unit, and
   a second learned model which is obtained by employing combinations of the data size and print setting conditions of document data of arbitrary print jobs and optimized RIP setting conditions, which are obtained by employing the first learned model to perform a predicting process for predicting the printing speed by inputting the data sizes of document data, print setting conditions, and arbitrary RIP setting conditions of the arbitrary print jobs and a determining process for determining optimized RIP setting conditions that would result in the predicted printing speed approaching or becoming greater than or equal to a processing seed of a printing unit, inputting the relationships between each of the combinations of the data sizes and the print setting conditions and optimized RIP setting conditions for each of the combinations, and conducting machine learning;
a RIP setting condition determining unit that employs the second learned model to determine optimized RIP setting conditions of a print job to be printed; and
a RIP processing unit that performs a RIP (Raster Image Processor) process for the print job to be printed based on the optimized RIP setting conditions which are determined by the RIP setting condition determining unit to generate print data, and outputs the generated print data to the printing unit.

* * * * *